(12) United States Patent
Kim et al.

(10) Patent No.: US 9,341,268 B2
(45) Date of Patent: May 17, 2016

(54) WATERTIGHT APPARATUS OF EXTERIOR COMPONENT FOR VEHICLE

(71) Applicants: Hyundai Motor Company, Seoul (KR); Kia Motors Corp., Seoul (KR)

(72) Inventors: Nam Cheol Kim, Suwon-Si (KR); Jeong Ho Lee, Suwon-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/541,034

(22) Filed: Nov. 13, 2014

(65) Prior Publication Data

US 2015/0307139 A1    Oct. 29, 2015

(30) Foreign Application Priority Data

Apr. 25, 2014 (KR) .................. 10-2014-0049823
Oct. 27, 2014 (KR) .................. 10-2014-0145677

(51) Int. Cl.
*B62D 65/14*     (2006.01)
*F16J 15/02*     (2006.01)
*B62D 35/00*     (2006.01)

(52) U.S. Cl.
CPC ............. *F16J 15/021* (2013.01); *B62D 35/007* (2013.01)

(58) Field of Classification Search
CPC ...... B62D 25/07; B62D 25/06; B62D 29/002; B62D 29/004; B62D 35/00; B62D 35/007; B62D 25/24; B62D 35/005; B62D 35/008; B62D 37/02; B62D 33/077; H01Q 1/32; F16B 35/00; F16J 15/021
USPC .......... 52/716.5, 716.6, 718.01; 296/91, 99.1, 296/180.1, 201, 208, 213–214; 24/292–293
See application file for complete search history.

(56) References Cited

U.S. PATENT DOCUMENTS

| | | | | | |
|---|---|---|---|---|---|
| 4,274,670 | A | * | 6/1981 | Pitzmann | B62D 35/007 296/180.1 |
| 4,339,145 | A | * | 7/1982 | Bott | B62D 35/007 224/316 |
| 4,603,898 | A | * | 8/1986 | Udagawa | B62D 35/007 15/250.001 |
| 4,754,586 | A | * | 7/1988 | Fujikawa | B60J 1/10 24/290 |
| 4,911,495 | A | * | 3/1990 | Haga | B62D 25/02 296/209 |
| 5,013,081 | A | * | 5/1991 | Cronce | B62D 35/007 296/180.1 |
| 5,249,836 | A | * | 10/1993 | Stanesic | B62D 35/007 296/180.1 |
| 5,382,070 | A | * | 1/1995 | Turner | B62D 35/007 296/180.1 |
| 5,435,617 | A | * | 7/1995 | Stanesic | B62D 35/007 296/180.1 |
| 5,845,960 | A | * | 12/1998 | Koike | B62D 35/007 296/180.1 |
| 5,947,547 | A | * | 9/1999 | Deeks | B60R 13/02 296/146.6 |

(Continued)

FOREIGN PATENT DOCUMENTS

DE    102011013818    *    9/2012    .............    B62D 25/06
JP       2003-72599 A         3/2003

(Continued)

*Primary Examiner* — Beth Stephan
(74) *Attorney, Agent, or Firm* — Morgan, Lewis & Bockius LLP

(57) ABSTRACT

A watertight apparatus of exterior component for a vehicle may include a coupling member coupling an exterior component and a vehicle body panel, and having a coupling groove formed on an outer circumferential surface of a part of the coupling member which passes through a vehicle body panel, and a watertight pad which is arranged to be in close contact with a bottom of the exterior component, a first side of which is coupled to a part of the vehicle body panel through which the coupling member passes and a second side of which is inserted into the coupling groove.

8 Claims, 4 Drawing Sheets

(56) References Cited

U.S. PATENT DOCUMENTS

| | | | | |
|---|---|---|---|---|
| 6,241,302 B1 * | 6/2001 | Rehkopf | ................ | B60J 1/2008 296/152 |
| 6,276,109 B1 * | 8/2001 | Hingorani | ............... | B60R 13/04 52/16.1 |
| 6,637,806 B2 * | 10/2003 | Kazama | ............... | B62D 35/007 296/180.1 |
| 6,659,538 B2 * | 12/2003 | Scheid | .................... | B60J 5/101 296/146.11 |
| 7,168,757 B2 * | 1/2007 | Futatsuhashi | ........... | B60R 13/04 296/193.05 |
| 7,618,084 B2 * | 11/2009 | Kimura | ................... | B60J 5/101 296/146.11 |
| 7,673,928 B2 * | 3/2010 | Walker | .................... | B60J 5/101 296/146.11 |
| 8,123,277 B2 * | 2/2012 | Aldersley | ................ | B60J 5/101 296/146.8 |
| 8,256,825 B1 * | 9/2012 | Dryja | ...................... | B60J 5/101 296/106 |
| 8,322,110 B2 * | 12/2012 | Chou | ..................... | B60R 13/04 24/289 |
| 8,567,838 B2 * | 10/2013 | Coakley | ................. | B60R 13/04 296/1.08 |
| 2006/0267381 A1 * | 11/2006 | Cave | .................. | B60R 13/0206 296/209 |
| 2010/0212252 A1 * | 8/2010 | Chou | ..................... | B60R 13/04 52/716.5 |

FOREIGN PATENT DOCUMENTS

| | | |
|---|---|---|
| JP | 2003-205733 A | 7/2003 |
| KR | 1998-0007938 U | 4/1998 |
| KR | 1998-049310 U | 10/1998 |
| KR | 1999-0025377 U | 7/1999 |
| KR | 10-2004-0022540 A | 3/2004 |
| KR | 10-2005-0038487 A | 4/2005 |

* cited by examiner

WATERTIGHT APPARATUS OF EXTERIOR COMPONENT FOR VEHICLE

CROSS REFERENCE TO RELATED APPLICATION

The present application claims priorities to Korean Patent Application No. 10-2014-0049823, filed Apr. 25, 2014, and Korean Patent Application No. 10-2014-0145677, filed Oct. 27, 2014 the entire contents of which are incorporated herein for all purposes by this reference.

BACKGROUND OF THE INVENTION

1. Field of the Invention

The present invention relates to a watertight apparatus of exterior components for a vehicle, and more particularly, to a watertight apparatus of exterior components for a vehicle capable of preventing moisture from being introduced into the interior of a vehicle through connection portions.

2. Description of Related Art

Generally, an exterior component for a vehicle includes various components such as a roof rack and a spoiler wherein these exterior components are connected to a vehicle body panel through a coupling member such as a bolt, a screw, and a fastener for coupling the component to a vehicle body.

In FIGS. 1 and 3, a spoiler as an example of the exterior component is coupled to a vehicle body, that is, the exterior component 1 (spoiler) is coupled to a vehicle body panel 2 through a coupling member 10 such as a fastening bolt wherein a head portion 11 of the coupling member 10 is fitted into a component groove 1a formed through the exterior component 1 from one side thereof and a body 12 of the coupling member 10 is connected to pass through a vehicle body panel 2 (tailgate panel).

Further, a watertight pad 20 is fitted into a hole through which the coupling member 10 passes on the vehicle body panel 2 so as to form a watertight structure and the coupling member 10 is arranged to pass through the watertight pad 20.

FIG. 3 is a view illustrating a watertight pad 20 that is fitted into a vehicle body panel 2 through a groove formed along a surrounding of the watertight pad 20 and FIG. 4 is a view illustrating a watertight pad 20 that is fitted between an exterior component 1 and a vehicle body panel 2.

However, in a case where the watertight pad 20 is pressed or dispersed when assembling the coupling member 10, a gap C1 is produced between the coupling member 10 and the watertight pad 20 and thus external moisture flows through the gap C1 when it rains or a vehicle is washed under a high pressure and is introduced into the interior of a vehicle through the fastening portion 12 of the coupling member 10, as indicated by an arrow M1 in the drawings. Here, the reference number 3 indicates a rear glass.

The information disclosed in this Background of the Invention section is only for enhancement of understanding of the general background of the present invention and should not be taken as an acknowledgement or any form of suggestion that this information forms the prior art already known to a person skilled in the art.

BRIEF SUMMARY

Various aspects of the present invention are directed to providing a watertight apparatus of an exterior component for a vehicle including a coupling member for coupling an exterior component and a vehicle body panel, and having a coupling groove formed on an outer circumferential surface of a part of the coupling member which passes through the vehicle body panel and a watertight pad which is arranged to be in close contact with a bottom of the exterior component and a first side of which is coupled to a part of the vehicle body panel through which the coupling member passes and a second side of which is inserted into the coupling groove.

In an aspect of the present invention, the watertight apparatus of the exterior component for the vehicle may further include a moisture discharging groove which is formed on the bottom of the exterior component on which the watertight pad is arranged to be close in contact, a first end of which is opened toward a component hole through which the coupling member passes and a second end of which is extended to be exposed to an outside of the watertight pad.

The watertight pad may be provided with an outer circumferential surface and an inner circumferential surface and shaped as a washer, and in which a pad groove opened toward the outer circumferential surface is formed along a circumferential direction on a thickness portion.

The edge of a panel hole of the vehicle body panel, through which the coupling member passes, is fitted into the pad groove, and the inner circumferential surface of the watertight pad is fitted into the coupling groove.

According to yet another aspect of the present invention, the watertight pad is formed of elastic material.

In another aspect of the present invention, a watertight apparatus of an exterior component for a vehicle may include a coupling member for coupling an exterior component and a vehicle body panel and a watertight pad which is arranged to be coupled to the vehicle body panel and fills a gap between the vehicle body panel and the coupling member, and a moisture discharging groove which is formed on a surface of the exterior component to be in contact with the watertight pad and guides moisture existing in the exterior component, the vehicle body panel, and the watertight pad to be discharged outside the watertight pad.

In still another aspect of the present invention, a watertight apparatus of an exterior component for a vehicle according to includes: an exterior component; a vehicle body panel arranged on a bottom of the exterior component to be spaced therefrom; a coupling member fitted into the exterior component and passing through the vehicle body panel so as to couple the exterior component and the vehicle body panel; and a watertight pad arranged between the exterior component and the vehicle body panel at a region of the vehicle body panel through which the coupling member passes, filling a gap between the exterior component and the vehicle body panel and contacting an outer circumferential surface of the coupling member.

In still yet another aspect of the present invention, the coupling member includes: a head portion that is fitted into a component groove formed through the exterior component from one side thereof; a fastening portion that is formed integrally with the head portion and passes through the watertight pad and the vehicle body panel; and a coupling groove that is formed on an outer circumferential surface of a region of the fastening portion through which the watertight pad passes along a circumferential direction.

In a preferred embodiment of the present invention, the watertight pad is provided with an outer circumferential surface and an inner circumferential surface and shaped as a washer, the inner circumferential surface of the watertight pad is fitted into the coupling groove of the coupling member whereby the watertight pad contacts an outer circumferential surface of the coupling member.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
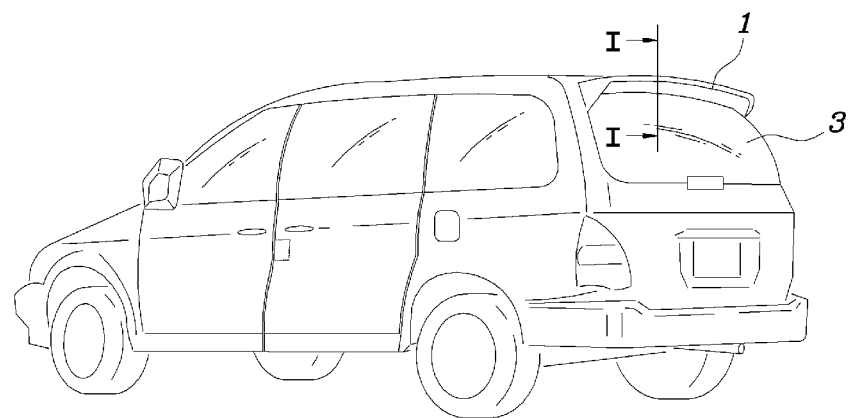
FIG. 1 is a perspective view illustrating a vehicle coupled with a spoiler as an example of exterior component.
Figure 2:
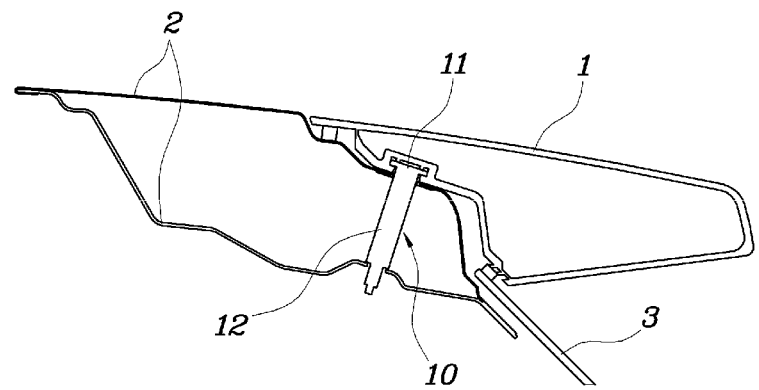
FIG. 2 is a cross-sectional view illustrating a conventional structure, taken along line I-I of FIG. 1.
Figure 3:
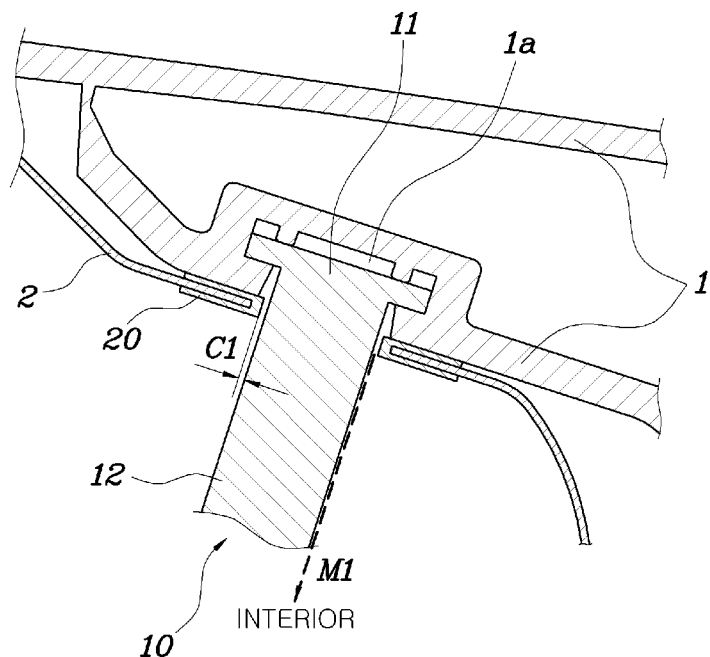
FIG. 3 is an enlarged view illustrating a watertight pad portion of FIG. 2.
Figure 4:
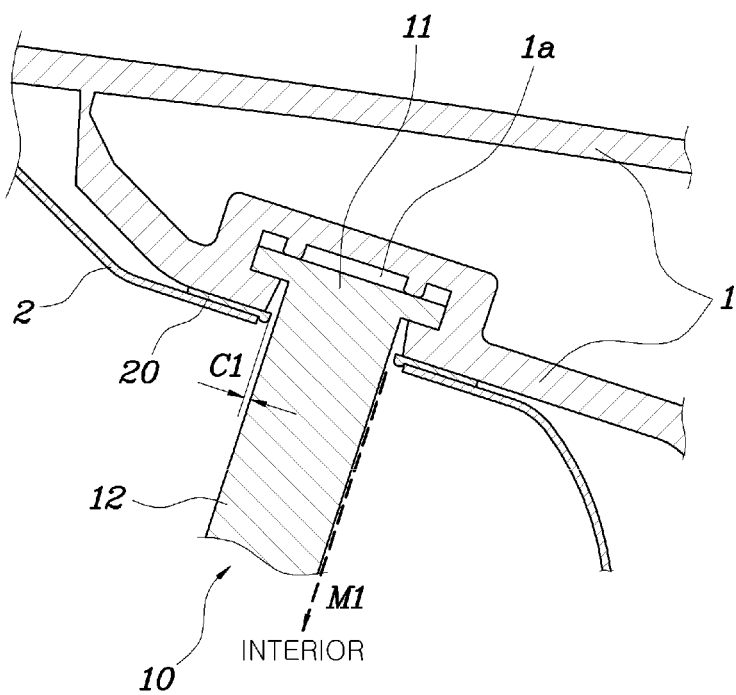
FIG. 4 is a view illustrating an exemplary watertight apparatus of exterior components for a vehicle according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention relates to a technology for preventing a generation of a gap between a coupling member and a vehicle body panel in a structure where an exterior component is coupled to a vehicle body through the coupling member, thereby to prevent external moisture from being introduced into an interior of a vehicle and same reference numerals are given to identical parts to those of a conventional structure.

Figure 5:
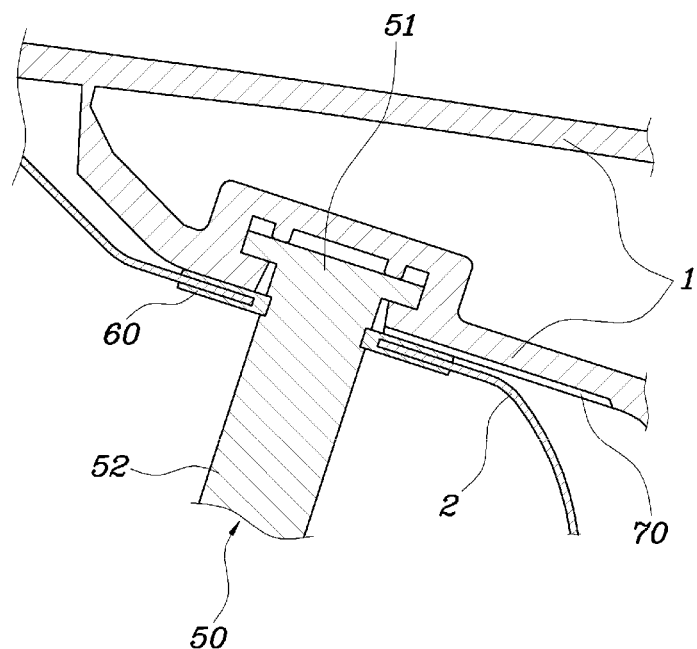
FIG. 5 is a cross-sectional view illustrating an exemplary watertight apparatus of exterior components for the vehicle according to an embodiment of the present invention, corresponding to FIG. 3.
Figure 6:
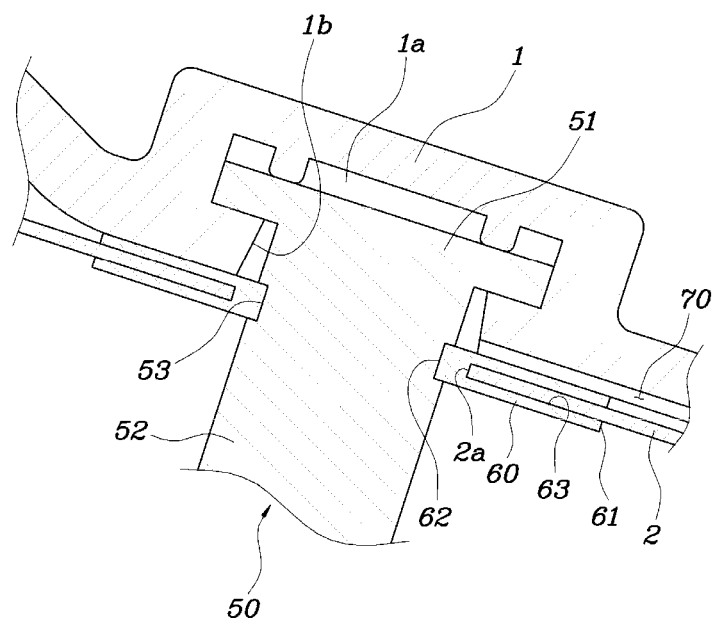
FIG. 6 is an enlarged view illustrating a watertight pad portion of FIG. 5.
Figure 7:
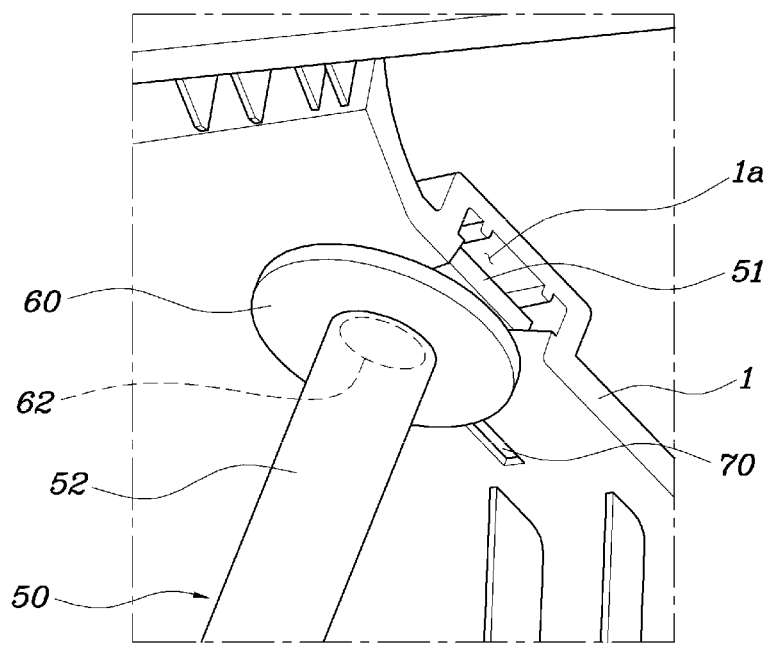
FIG. 7 is a perspective view shown from a bottom illustrating an exemplary watertight apparatus of exterior components for a vehicle without a vehicle body panel, shown in FIG. 5.

As shown in FIGS. 5 to 7, an exemplary watertight apparatus of exterior component for a vehicle according to the present invention for coupling an exterior component 1 to a vehicle body panel 2, may include a coupling member 50 having a coupling groove 53 formed on an outer circumferential surface of a part of which passes through the vehicle body panel 2 and a watertight pad 60 which is arranged to be in close contact with a bottom of the exterior component 1 and one side of which is coupled to a part of the vehicle body panel 2 through which the coupling member 50 passes and the other side of which is inserted into the coupling groove 53.

That is, the watertight pad 60 is made of rubber or silicon as a washer shape, on an outer circumferential surface of which a pad groove 63 is formed along a circumferential direction and an inner diameter portion of the vehicle body panel 2 is fitted into the pad groove 63 and an inner circumferential portion of the watertight pad is fitted into the coupling groove 53 of the coupling member 50.

Here, the coupling member 50 may be provided with a head portion 51 and a fastening portion 52. The head portion 51 is fitted into a component groove 1a formed through the exterior component 1 from one side thereof, and the fastening portion 52 is arranged to pass through the vehicle body panel 2. The coupling groove 53 is formed along an outer circumferential surface of the fastening portion 52 and a remote end of the coupling member 50 that passes through the vehicle body panel 2 is fastened to a fastening member such as a nut, accordingly, the exterior component 1, the vehicle body panel 2 and the watertight pad 60 are assembled completely.

The watertight apparatus of exterior component for the vehicle according to the present invention may further include a moisture discharging groove 70 which is formed on the bottom of the exterior component 1 on which the watertight pad 60 is arranged to be in close contact, one end of which is opened toward a component hole 1a through which the coupling member 50 passes and the other end of which is extended to be exposed to the outside of the watertight pad 60.

The watertight pad 60 is provided to fill a gap between the vehicle body panel 2 and the coupling member 50. By virtue of the watertight pad 60, any external moisture is prevented from flowing along the fastening portion 52 of the coupling member 50 to be introduced into the interior of a vehicle, when it rains or a vehicle is washed under a high pressure.

Further, the moisture discharging groove 70 serves to guide the introduced moisture to be discharged outside the watertight pad 60 in case where the moisture is introduced into the exterior component 1, the vehicle body panel 2 and the watertight pad 60 when it rains or a vehicle is washed under a high pressure, thereby further preventing the introduction of moisture into the interior of a vehicle.

The watertight pad 60 according to the present invention may be provided with an outer circumferential surface 61 and an inner circumferential surface 62 and shaped as a washer in which a pad groove 63 opened toward the outer circumferential surface 61 is formed along a circumferential direction on a thickness portion. Here, the edge of a panel hole 2a of the vehicle body panel 2, through which the coupling member 50 passes, is fitted into the pad groove 63 and the inner circumferential surface 62 of the watertight pad 60 is fitted into the coupling groove 53 formed through the coupling member 50.

That is, the watertight pad 60 is arranged such that the outer circumferential surface 61 and the inner circumferential surface 62 thereof couple to the vehicle body panel 2 and the coupling member 50, respectively, to fill the gap between the vehicle body panel 2 and the coupling member 50.

The watertight pad 60 may be formed of elastic material, for example, rubber or plastic resin having elastic property, so as to enforce adhering force with the exterior component 1 and coupling force to the vehicle body panel 2 and further facilitate fitting into the coupling groove 53 of the coupling member 50.

Figure 8:
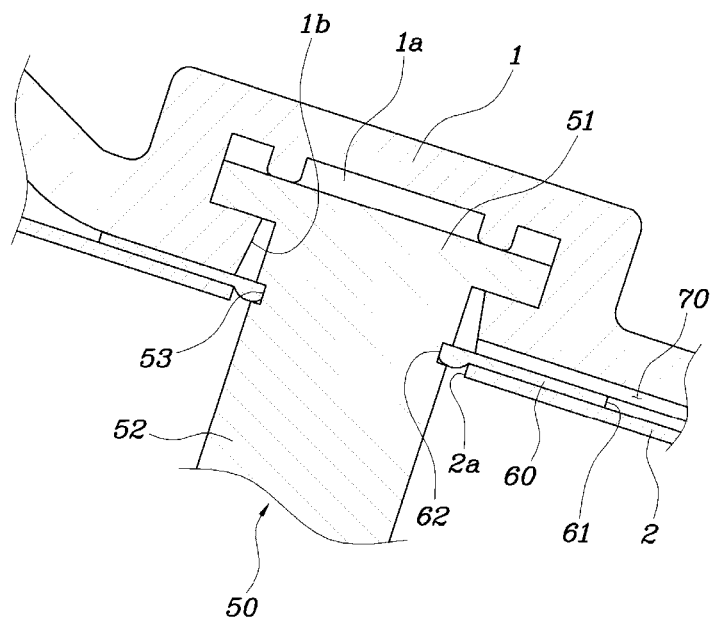
FIG. 8 is a cross-sectional view illustrating an exemplary watertight apparatus of exterior components for the vehicle according to another embodiment of the present invention, corresponding to FIG. 4.

As shown in FIG. 8, a gap between the exterior component 1 and the vehicle body panel 2 is filled by the watertight pad 60 in the watertight apparatus of exterior components for a vehicle according to another embodiment of the present invention.

That is, the watertight apparatus of exterior components for a vehicle according to the present invention includes: an exterior component 1; a vehicle body panel 2 arranged on a bottom of the exterior component 1 to be spaced therefrom; a coupling member 50 fitted into the exterior component 1 and passing through the vehicle body panel 2 so as to couple the exterior component 1 and the vehicle body panel 2; and a watertight pad 60 arranged between the exterior component 1 and the vehicle body panel 2 at a region of the vehicle body panel 2 through which the coupling member 50 passes, filling a gap between the exterior component 1 and the vehicle body panel 2 and contacting an outer circumferential surface of the coupling member 50.

Further, the watertight apparatus of exterior components for a vehicle according to the present invention further includes a moisture discharging groove 70 which is formed on the bottom of the exterior component 1 on which the watertight pad 60 is arranged to be in close contact, a first end of which is opened toward a space of the exterior component 1 through which the coupling member passes and a second end of which is extended to be exposed to an outside of the watertight pad.

Further, the coupling member 50 includes: a head portion 51 that is fitted into a component groove 1a formed through the exterior component 1 from one side thereof; a fastening portion 52 that is formed integrally with the head portion 51 and passes through the watertight pad 60 and the vehicle body panel 2; and a coupling groove 53 that is formed on an outer circumferential surface of a region of the fastening portion 52 through which the watertight pad 60 passes along a circumferential direction.

Here, the watertight pad 60 is provided with an outer circumferential surface 61 and an inner circumferential surface 62 and shaped as a washer, the inner circumferential surface 62 of the watertight pad 60 is fitted into the coupling groove 53 of the coupling member 50 whereby the watertight pad 60 contacts an outer circumferential surface of the coupling member 50.

As described above, in the structure in which the exterior component 1 for a vehicle is coupled to the vehicle body panel 2 through the coupling member 50 such as a bolt, a gap between the vehicle body panel 2 and the coupling member 50 is filled by the watertight pad 60 arranged to couple the vehicle body panel 2 and the coupling member 50 so that external moisture is prevented from flowing along the fastening portion 52 of the coupling member 50 to be introduced into the interior of a vehicle, when it rains or a vehicle is washed under a high pressure.

Further, the moisture discharging groove 70 is formed on the bottom of the exterior component 1 to be in contact with the watertight pad 60 so that the moisture introduced into the exterior component 1, the vehicle body panel 2 and the watertight pad 60 when it rains or a vehicle is washed under a high pressure, is easily discharged outside the watertight pad 60 through the moisture discharging groove 70, thereby further preventing the introduction of moisture into the interior of a vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A watertight apparatus of an exterior component for a vehicle comprising:
    a coupling member coupling an exterior component and a vehicle body panel, and having a coupling groove formed on an outer circumferential surface of a part of the coupling member which passes through the vehicle body panel;
    a watertight pad which is arranged to be in close contact with a bottom of the exterior component and a first side of which is coupled to a part of the vehicle body panel through which the coupling member passes and a second side of which is inserted into the coupling groove; and
    a moisture discharging groove which is formed on the bottom of the exterior component on which the watertight pad is arranged to be in close contact, a first end of which is opened toward a component hole through which the coupling member passes and a second end of which is extended to be exposed to an outside of the watertight pad.

2. The watertight apparatus of the exterior component of claim 1,
    wherein the watertight pad is provided with an outer circumferential surface and an inner circumferential surface and has a circular shape with a hole at a center thereof to receive the coupling member,
    wherein a pad groove formed in the outer circumferential surface of the watertight pad and opened toward the outer circumferential surface is disposed along a circumferential direction on a thickness portion,
    wherein an edge of a panel hole of the vehicle body panel, through which the coupling member passes, is fitted into the pad groove, and
    wherein the inner circumferential surface of the watertight pad is fitted into the coupling groove.

3. The watertight apparatus of the exterior component of claim 1, wherein the watertight pad is made of an elastic material.

4. A watertight apparatus of an exterior component for a vehicle comprising:
- a coupling member coupling an exterior component and a vehicle body panel and a watertight pad coupled to the vehicle body panel and filling a gap between the vehicle body panel and the coupling member; and
- a moisture discharging groove which is formed on a surface of the exterior component to be in contact with the watertight pad and guides moisture existing in the exterior component, the vehicle body panel, and the watertight pad to be discharged outside the watertight pad.

5. A watertight apparatus of an exterior component for a vehicle comprising:
- an exterior component;
- a vehicle body panel arranged on a bottom of the exterior component to be spaced therefrom;
- a coupling member fitted into the exterior component and passing through the vehicle body panel so as to couple the exterior component and the vehicle body panel; and
- a watertight pad arranged between the exterior component and the vehicle body panel at a region of the vehicle body panel through which the coupling member passes, filling a gap between the exterior component and the vehicle body panel and contacting an outer circumferential surface of the coupling member; and
- a moisture discharging groove which is formed on the bottom of the exterior component on which the watertight pad is arranged to be in close contact, a first end of which is opened toward a space of the exterior component through which the coupling member passes and a second end of which is extended to be exposed to an outside of the watertight pad.

6. The watertight apparatus of an exterior component for the vehicle of claim 5, wherein the coupling member comprises: a head portion that is fitted into a component groove formed through the exterior component from one side thereof; a fastening portion that is formed integrally with the head portion and passes through the watertight pad and the vehicle body panel; and a coupling groove that is formed on an outer circumferential surface of a region of the fastening portion through which the watertight pad passes along a circumferential direction.

7. The watertight apparatus of an exterior component for the vehicle of claim 6, wherein the watertight pad is provided with an outer circumferential surface and an inner circumferential surface and has a circular shape with a hole at a center thereof to receive the coupling member, the inner circumferential surface of the watertight pad is fitted into the coupling groove of the coupling member whereby the watertight pad contacts an outer circumferential surface of the coupling member.

8. The watertight apparatus of an exterior component for the vehicle of claim 5, wherein the watertight pad is made of elastic material.

* * * * *